(12) United States Patent
Chan et al.

(10) Patent No.: US 9,015,164 B2
(45) Date of Patent: *Apr. 21, 2015

(54) HIGH AVAILABILITY FOR CLOUD SERVERS

(71) Applicant: International Business Machines Corporation, Armonk, NY (US)

(72) Inventors: Hoi Y. Chan, Stamford, CT (US); Trieu C. Chieu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/965,386

(22) Filed: Aug. 13, 2013

(65) Prior Publication Data
US 2014/0149354 A1 May 29, 2014

Related U.S. Application Data

(63) Continuation of application No. 13/688,821, filed on Nov. 29, 2012.

(51) Int. Cl.
*G06F 17/30* (2006.01)
*G06F 9/455* (2006.01)

(52) U.S. Cl.
CPC .......... *G06F 17/30088* (2013.01); *G06F 9/455* (2013.01); *G06F 2009/4557* (2013.01)

(58) Field of Classification Search
CPC ... G06F 17/30088; G06F 9/455; G06F 3/065; G06F 3/0667; G06F 17/30; G06F 17/30156; G06F 9/46; G06F 8/65; G06F 9/45533; G06F 9/45558; G06F 11/1469; G06F 11/1446; G06F 2009/14557; G06F 17/30008; G06F 2009/4557; G06T 1/00; H04L 29/08144; H04L 67/42
USPC ......... 707/639, 652, 634, 646, 769, 692, 813, 707/618, E17.014, E17.01, E17.007, 707/E17.005, 737, E17.089; 711/162, 216, 711/118, 154, 159, 170, 171, 168, 112, 173, 711/103, E12.008, 6, E12.065, E12.002, 711/E12.022, 153, E12.103, E12.001, 711/E12.84; 714/15, 37, 45, 19, 27, 714/E11.025, 35, E11.029, E11.174; 718/1, 718/100, 104, 1.102; 709/226, 203, 213, 709/231, 227, 223, 224, 225
See application file for complete search history.

(56) References Cited

U.S. PATENT DOCUMENTS 6,973,646 B1 * 12/2005 Bordawekar et al. ......... 717/146
7,779,295 B1 * 8/2010 Shah et al. .................... 714/6.32

(Continued)

FOREIGN PATENT DOCUMENTS

WO WO2012067964 A1 5/2012

OTHER PUBLICATIONS

Pavel Segec and Tatiana Kovacikova—"A survey of open source products for building a SIP communication platform"—Published in: Journal Advances in Multimedia archive—vol. 2011, Jan. 2011 Article No. 5—pp. 1-21.*

(Continued)

*Primary Examiner* — Anh Ly
(74) *Attorney, Agent, or Firm* — Cantor Colburn LLP; Preston Young

(57) ABSTRACT

A high availability system in a cloud computing environment includes a snapshot manager disposed in a mirror environment having at least one computer server and a plurality of virtual machines disposed in a production environment. Each of the plurality of virtual machines includes a snapshot agent configured to perform a method. The method includes periodically taking snapshots of the virtual machine associated with the snapshot agent, determining a delta image based on a change between a current snapshot and a previous snapshot, removing previous snapshots in the virtual machine and transmitting the delta image to the snapshot manager. The snapshot manager is configured to store a recovery image for each of the plurality of virtual machines and to merge the received delta image with the recovery image to update the recovery image.

4 Claims, 7 Drawing Sheets

(56) References Cited

U.S. PATENT DOCUMENTS

| | | | |
|---|---|---|---|
| 8,117,495 B2 | 2/2012 | Graham et al. | |
| 8,140,907 B2 | 3/2012 | Beaty et al. | |
| 8,299,944 B2 | 10/2012 | Provenzano | |
| 8,312,318 B2 | 11/2012 | Graham et al. | |
| 8,843,489 B2 | 9/2014 | Provenzano | |
| 2004/0006354 A1* | 1/2004 | Schaefer et al. | 606/157 |
| 2007/0094659 A1* | 4/2007 | Singh et al. | 718/1 |
| 2007/0234356 A1 | 10/2007 | Martins et al. | |
| 2009/0260007 A1 | 10/2009 | Beaty et al. | |
| 2009/0276771 A1* | 11/2009 | Nickolov et al. | 717/177 |
| 2010/0049929 A1 | 2/2010 | Nagarkar et al. | |
| 2010/0058106 A1 | 3/2010 | Srinivasan et al. | |
| 2010/0107158 A1* | 4/2010 | Chen et al. | 718/1 |
| 2010/0313185 A1 | 12/2010 | Gupta et al. | |
| 2010/0332818 A1 | 12/2010 | Prahlad et al. | |
| 2011/0055299 A1 | 3/2011 | Phillips | |
| 2011/0131330 A1 | 6/2011 | Beaty et al. | |
| 2011/0197097 A1* | 8/2011 | Beaty et al. | 714/27 |
| 2011/0238402 A1* | 9/2011 | Kotani et al. | 703/22 |
| 2012/0016840 A1 | 1/2012 | Lin | |
| 2012/0072393 A1* | 3/2012 | Kumar et al. | 707/634 |
| 2012/0124046 A1 | 5/2012 | Provenzano | |
| 2012/0124306 A1* | 5/2012 | Abercrombie et al. | 711/162 |
| 2012/0124307 A1 | 5/2012 | Ashutosh et al. | |
| 2012/0158659 A1 | 6/2012 | Marathe et al. | |
| 2012/0254110 A1* | 10/2012 | Takemoto | 707/624 |
| 2012/0284716 A1* | 11/2012 | Martins et al. | 718/1 |
| 2013/0080387 A1* | 3/2013 | Mohl et al. | 707/624 |
| 2013/0091499 A1* | 4/2013 | Soundararajan et al. | 718/1 |
| 2013/0097377 A1* | 4/2013 | Satoyama et al. | 711/114 |
| 2013/0219135 A1 | 8/2013 | Knowles et al. | |
| 2013/0238562 A1* | 9/2013 | Kumarasamy et al. | 707/649 |
| 2013/0290781 A1* | 10/2013 | Chen et al. | 714/19 |
| 2013/0305002 A1* | 11/2013 | Hallak et al. | 711/162 |
| 2013/0318053 A1 | 11/2013 | Provenzano et al. | |
| 2013/0339407 A1* | 12/2013 | Sharpe et al. | 707/827 |
| 2013/0347111 A1 | 12/2013 | Karta et al. | |
| 2014/0006357 A1* | 1/2014 | Davis et al. | 707/667 |
| 2014/0108351 A1* | 4/2014 | Nallathambi et al. | 707/639 |

OTHER PUBLICATIONS

Udaya Tupakula, Vijay Varadharajan and Abhishek Bichhawat—"Security architecture for virtual machines"—Algorithms and Architectures for Parallel Processing Lecture Notes in Computer Science Volume 7016, 2011, Oct. 24-26, 2011—pp. 218-229.*

Chan, et al., "An Approach to High Availability for Cloud Servers with Snapshot Mechanism" Middleware 2012 Industry Track, Dec. 3-7, 2012 (p. 1-6).

Mell, et al. "The NIST Definition of Cloud Computing", Recommendations of the National Institute of Standards and Technology, Jan. 2011, 7 pages.

Bowers, et al., "HAIL: A High-Availability and Integrity Layer for Cloud Storage", CCS '09 Proceedings of the 16th ACM Conference on Computer and Communications Security, Nov. 9-13, 2009, pp. 187-199.

Buyya, et al, "Market-Oriented Cloud Computing: Vision, Hype and Reality for Delivering IT Services as Computing Utilities", Department of Computer Science and Software Engineering, Jul. 2008, pp. 9.

Chappell, "A Short Introduction to Cloud Platforms", David Chappell & Associates, Aug. 2008, 13 pages.

Dias, et al., "A Scalable and Highly Available Web Server", Compcon '96. 'Technologies for the Super Highway' Digest of Papers, Issue Date: Feb. 25-28, 1996, pp. 85-92.

Gerofi, et al., "Utilizing Memory Content Similarity for Improving the Performance of Replicated Virtual Machines", Utility and Cloud Computing (UCC), 2011 Fourth IEEE International Conference on Utility and Cloud Computing, Dec. 5-8, 2011, pp. 73-80.

Golubchik, et al., "Chained DeClustering: Load Balancing and Robustness to Skew and Failures", Second International Workshop on Research Issues on Date Engineering: Transaction and Query Processing, Feb. 2-3, 1992.

Kangarlou, et al., "In-Network Live Snapshot Service for Recovering Virtual Infrastructures", Network, IEEE, vol. 25, No. 4, pp. 12-19, Jul./Aug. 2011.

Park, et al., "Fast and Space-Efficient Virtual Machine Checkpointing", VEE '11, Proceedings of the 7th ACM SIGPLAN/SIGOPS International Conference on Virtual Execution Environments, Mar. 9-11, 2011, pp. 75-86.

Sun, et al., "Availability Requirement for a Fault-Management Server in High-Availability Communication Systems", Reliability, IEEE Transaction, Issue Date: Jun. 2003, vol. 52, Issue 2, pp. 238-244.

Tewari, et al., "High Availability in Clustered Multimedia Servers", Data Engineering, 1996. Proceedings of the Twelfth International Conference, Issue Date: Feb. 26-Mar. 1, 1996; pp. 645-654.

Valcarenghi, et al., "Guaranteeing High Availability to Client-Server Communications", Transparent Optical Networks, 2008. ICTON 2008. 10th Anniversary International Conference, Issue Date: Jun. 22-26, 2008, pp. 34-37 and pp. 645-654.

Wei, et al., "Service-Oriented Computing and Cloud Computing: Challenges and Opportunities", Internet Computing, IEEE Issue: Nov.-Dec. 2010, vol. 14, Issue 6, pp. 72-75.

Yang, et al., "On Improvement of Cloud Virtual Machine Availablity with Virtualization Fault Tolerance Mechanism", 2011 Third IEEE International Conference on Cloud Computing Technology and Science, Nov. 29-Dec. 1, 2011, pp. 122-129.

Yu, et al., "SNPdisk: An Efficient Para-Virtualization Snapshot Mechanism for Virtual Disks in Private Clouds", Network, IEEE, vol. 25, No. 4, pp. 20-26, Jul.-Aug. 2011.

Testimony of C.M. Furlani, Director of Information Technology Laboratory, National Institute of Standards and Technology, United States Department of Commerce, United States House of Representatives Committee on Oversight and Government Reform, "Cloud Computing: Benefits and Ricks of Moving Federal IT into the Cloud", Jul. 1, 2010, 11 pages.

Chieu, T , et al., "Virtual Machines with Sharable Operating System", IBM Research Report; RC 25196 (W1108-006) Aug. 1, 2011; Abstract, Section IV; pp. 1-7.

Chan, et al., "An Approach to High Availability for Cloud Servers with Snapshot Mechanism" IBM . . . , Proceeding MIDDLEWARE '12 Proceedings of the Industrial Track of the 13th ACM/IFIP/USENIX International Middleware Conference, Dec. 3-7, 2012; 6 pgs.

International Search Report mailed Feb. 19, 2014; International Application No. PCT/US13/51934; International Filing Date: Jul. 25, 2013; 7 pages.

Price et al., "Garbage Collector Memory Accounting in Language-Based Systems", Proceeeding SP '03, Proceedings of the 2003 IEEE Symposium on Security and Privacy; pp. 1-12.

Written Opinion of the International Searching Authority mailed Feb. 19, 2014; International Application No. PCT/US13/51934; International Filing Date: Jul. 25, 2013; 5 pages.

* cited by examiner

HIGH AVAILABILITY FOR CLOUD SERVERS

This application is a continuation application of the legally related U.S. Ser. No. 13/688,821 filed Nov. 29, 2012, the contents of which are incorporated by reference herein in their entirety.

BACKGROUND

The present invention relates to cloud servers, and more specifically, to high availability for cloud servers.

In general, cloud computing refers to server-based computing that allows users to transact with server resources using a variety of devices. Cloud computing applications are provided by a server, which allows users to use the applications without downloading and installing applications on their own device. Virtualization technologies commonly used in cloud computing enable the execution of multiple virtual machine instances with different operating systems on a single physical host. Each virtual machine instance functions independently as an isolated system with its own physical resources, OS and applications. Due to significant cost saving and efficiency, the virtualization model has been increasingly adopted by enterprises and service providers as their main computing and service delivery infrastructure, running critical internal business and external customer facing applications.

In order to minimize down time due to unexpected virtual machine crashes, a backup system is usually built into the infrastructure. Currently, there are many backup technology options available such as replication, mirroring and fail over clustering. Existing backup technologies are designed based on the traditional computing models and are costly to implement. In addition, these technologies can be complicated and tedious to maintain and often require additional expensive hardware and software components. With the widespread adaptation of cloud computing, due to its potential cost benefit and efficiency, the virtualization model has been increasingly adopted by enterprises and service providers.

SUMMARY

According to an exemplary embodiment, a high availability system in a cloud computing environment includes a snapshot manager disposed in a mirror environment having at least one computer server and a plurality of virtual machines disposed in a production environment. Each of the plurality of virtual machines includes a snapshot agent configured to perform a method. The method includes periodically taking snapshots of the virtual machine associated with the snapshot agent, determining a delta image based on a change between a current snapshot and a previous snapshot and transmitting the delta image to the snapshot manager. The snapshot manager is configured to store a recovery image for each of the plurality of virtual machines and to merge the received delta image with the recovery image to update the recovery image. In one embodiment, the snapshot manager is configured to identify and utilize an under utilized resource with the cloud computing environment for merging the received delta image with the recovery image to update the recovery image.

According to another exemplary embodiment, a computer program product for providing a high availability system in a cloud computing environment, the computer program product including a non-transitory storage medium readable by a processing circuit and storing instructions for execution by the processing circuit for performing a method. The method includes creating a virtual machine in response to a user request and creating a snapshot agent for the virtual machine and registering the snapshot agent with a snapshot manager. The snapshot agent is configured to periodically take snapshots of the virtual machine associated with the snapshot agent, determine a delta image based on a change between a current snapshot and a previous snapshot and transmit the delta image to the snapshot manager. The snapshot agent is also configured to monitor a health of the virtual machine and to notify the snapshot manager if the virtual machine experiences abnormal behavior. The method also includes receiving a recovery image for the virtual machine from the snapshot manager in response to the virtual machine experiencing abnormal behavior and restoring the virtual machine with the recovery image.

According to yet another exemplary embodiment, a method for providing a high availability system in a cloud computing environment includes creating a virtual machine in response to a user request and creating a snapshot agent for the virtual machine and registering the snapshot agent with a snapshot manager. The snapshot agent is configured to periodically take snapshots of the virtual machine associated with the snapshot agent, determine a delta image based on a change between a current snapshot and a previous snapshot and transmit the delta image to the snapshot manager. The snapshot agent is also configured to monitor a health of the virtual machine and to notify the snapshot manager if the virtual machine experiences abnormal behavior. The method also includes receiving a recovery image for the virtual machine from the snapshot manager in response to the virtual machine experiencing abnormal behavior and restoring the virtual machine with the recovery image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
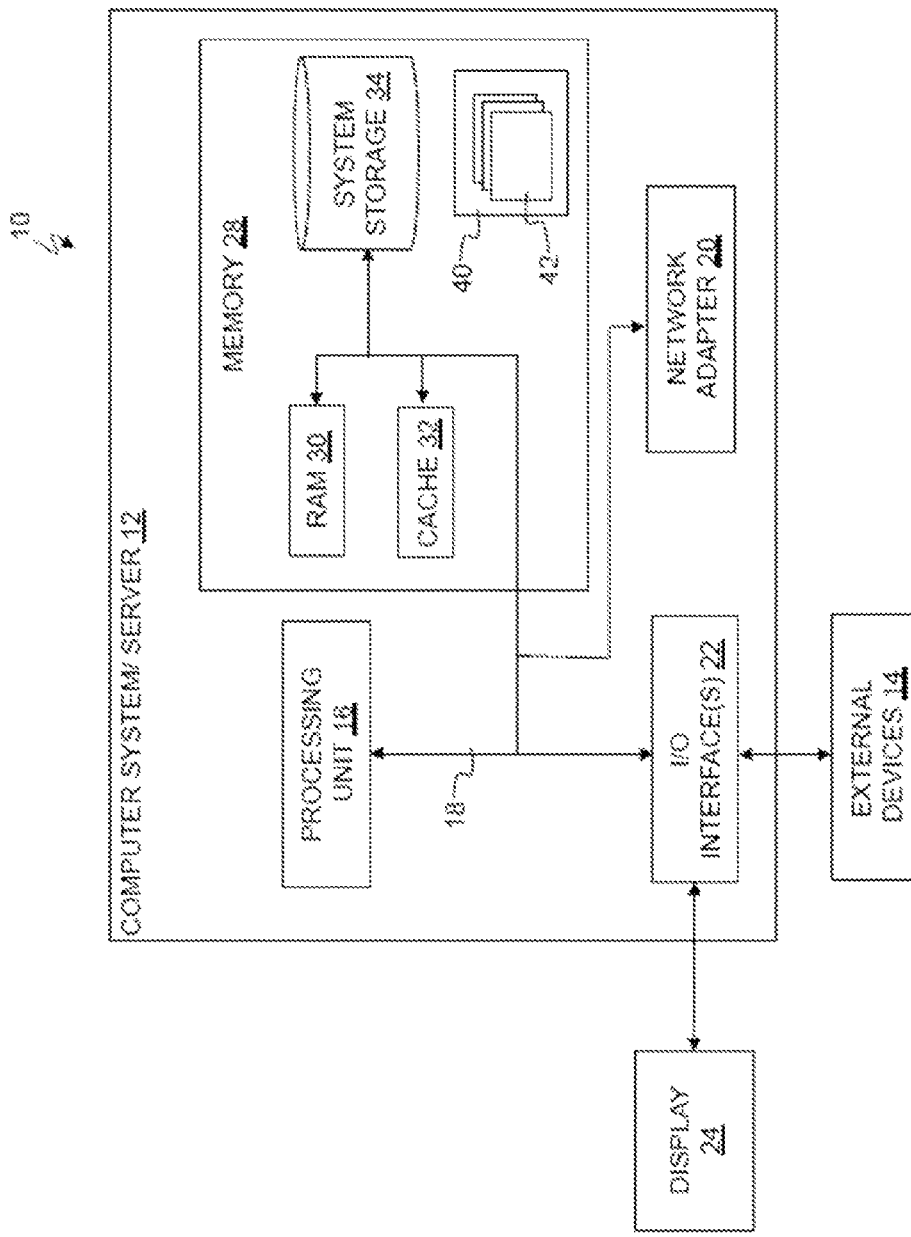
FIG. 1 illustrates a schematic of an example of a cloud computing node in accordance with exemplary embodiments.

Referring now to FIG. 1, FIG. 1 illustrates a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
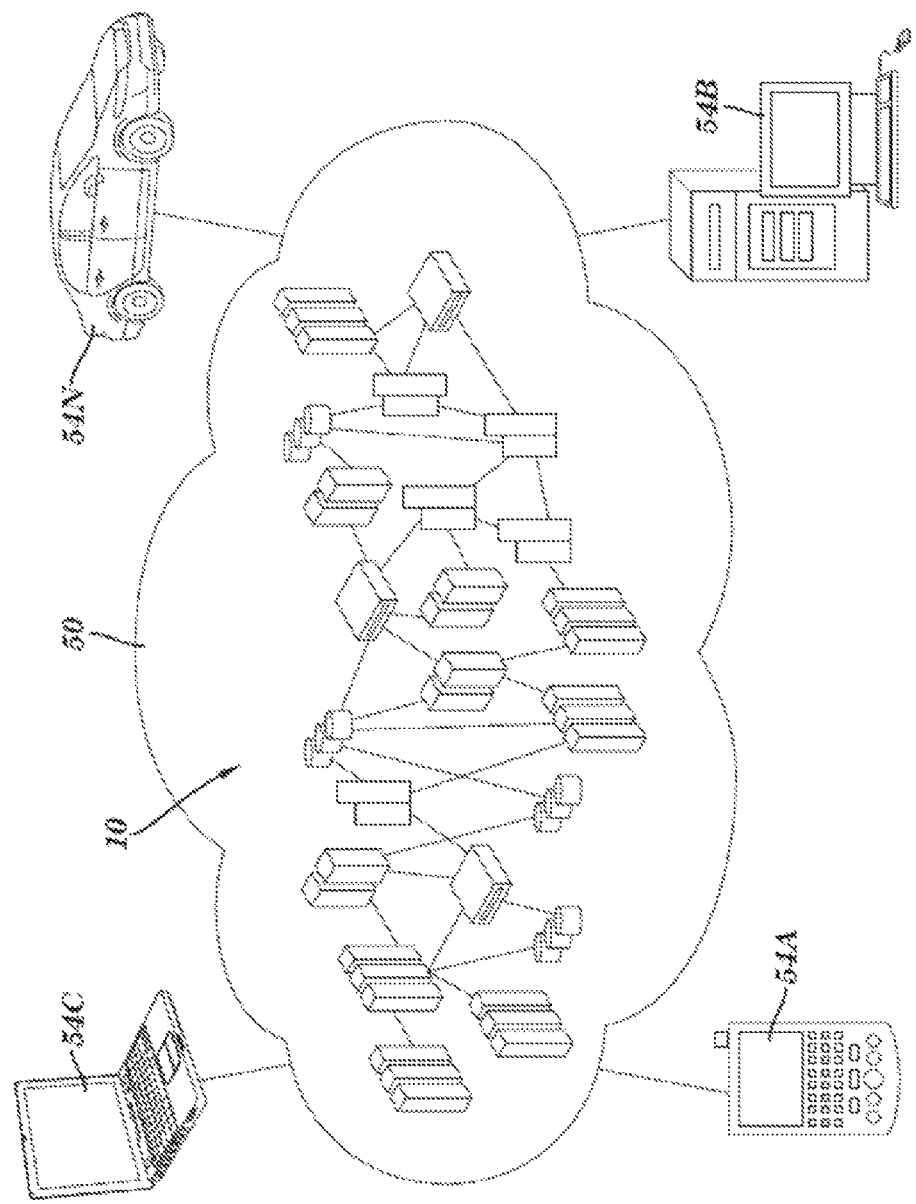
FIG. 2 illustrates a cloud computing environment in accordance with exemplary embodiments.

Referring now to FIG. 2, FIG. 2 illustrates a cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
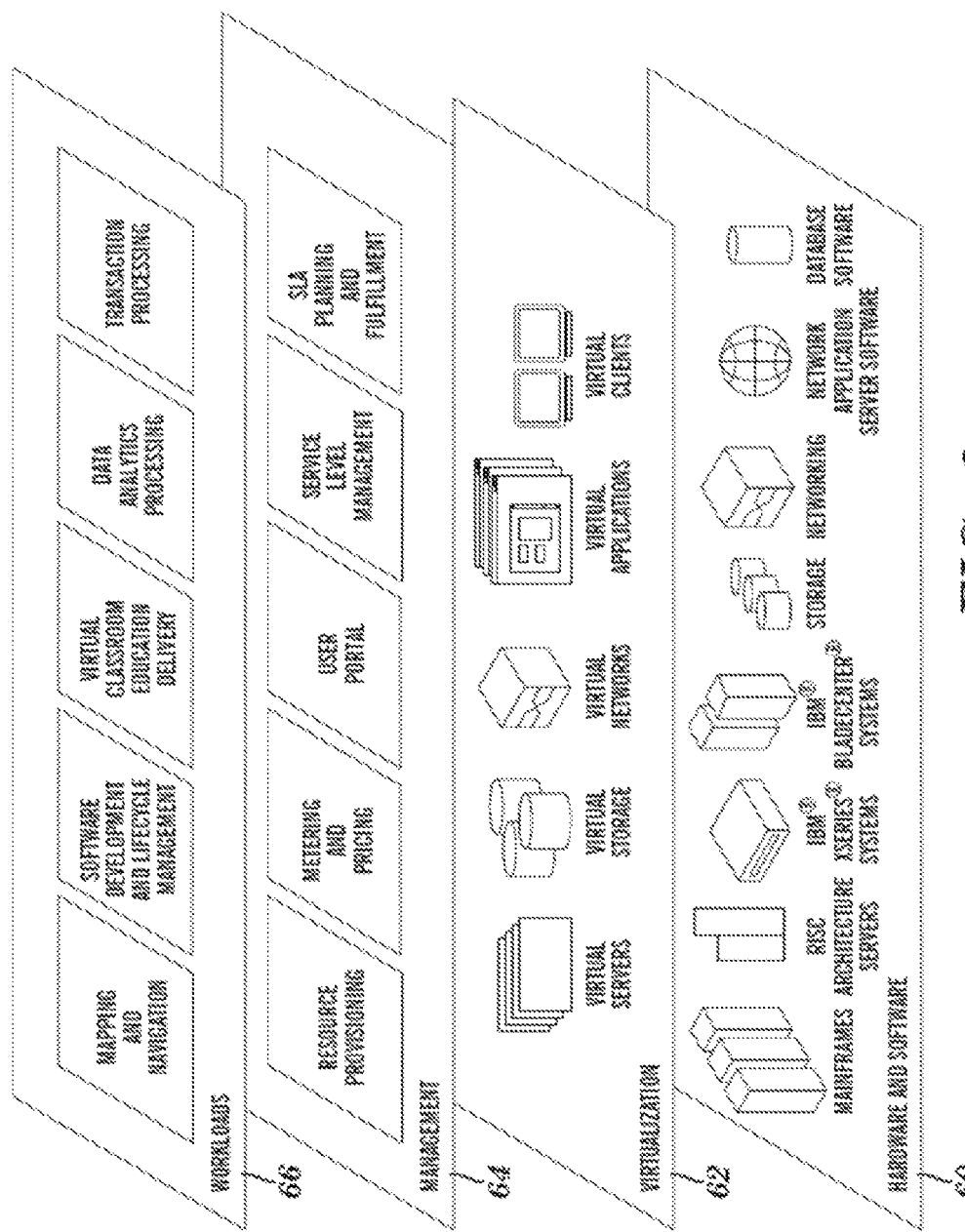
FIG. 3 illustrates a set of functional abstraction layers provided by a cloud computing environment in accordance with exemplary embodiments.

Referring now to FIG. 3, FIG. 3 illustrates a set of functional abstraction layers provided by cloud computing environment 50 (shown in FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems;

IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. The management layer 64 also includes a forecasting-based service assignment module.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. Further, other types of workloads may also include web service workloads, enterprise applications such as billing and customer relationship management, various banking and finance applications, etc.

Figure 4:
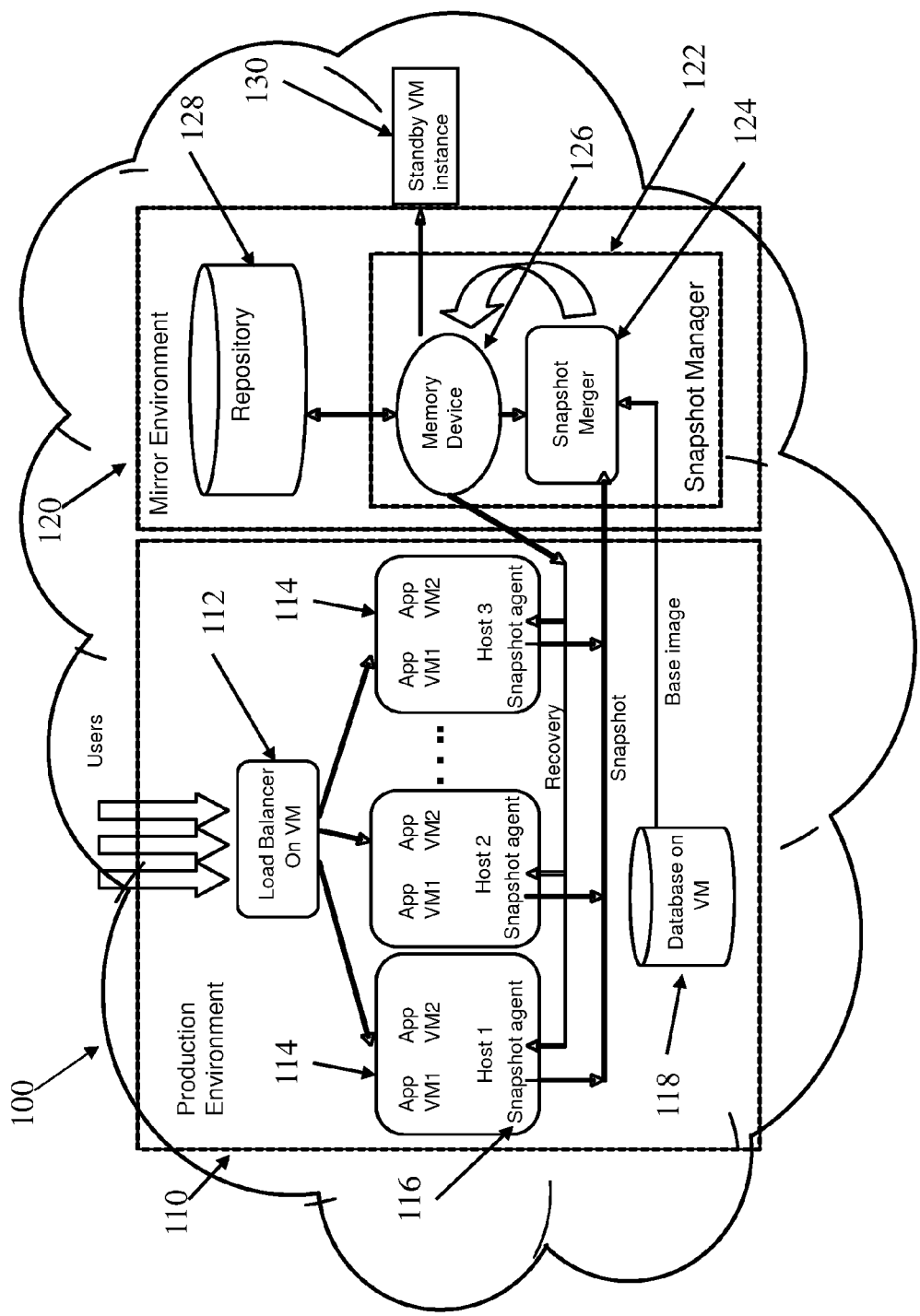
FIG. 4 illustrates a high availability system in a cloud computing environment in accordance with exemplary embodiments.

Referring now to FIG. 4, a high availability system 100 in a cloud computing environment in accordance with an exemplary embodiment is shown. As illustrated the high availability system 100 includes a production environment 110 and a mirror environment 120. In exemplary embodiments, the production environment 110 may be disposed on one or more servers and the mirror environment 120 is disposed on one or more remote servers, which may be located in a separate physical location. In exemplary embodiments, the one or more servers and one or more remote servers are configured to communicate with one another through a variety of known methods.

The production environment 110 includes a load balancer 112, a plurality of virtual machines 114 and a database 118. In exemplary embodiments, the load balancer 112 receives communications from users of the system 100 and directs the communications to an appropriate virtual machine 114. The load balancer 112 may also be configured to manage the virtual machines 114 in the production environment 110. For example, the load balancer 112 may be configured to create new instances of virtual machines 114 in response to user requests. Each of the plurality of virtual machines 114 includes one or more applications and a snapshot agent 116.

In exemplary embodiments, the snapshot agents 116 are configured to communicate with a snapshot manager 122, which is located on the mirror environment 120. In exemplary embodiments, the database 118 is configured to store the snapshots generated by the snapshot agent 116 and may also store base, or start-up images, that are used to create new instances of virtual machines 114.

In exemplary embodiments, the snapshot agent 116 is configured to periodically take snapshots of the virtual machine 114. In exemplary embodiments, a snapshot includes both the state and the data of a virtual machine 114 at a specific point in time. The data includes all of the files that constitute the virtual machine which includes, but is not limited to, disks, memory, and other devices, such as virtual network interface cards. In exemplary embodiments, the snapshot agent 116 may be configured to take an initial snapshot of a virtual machine 114, or to load a known base image from database 118 that serves as a snapshot for a newly created virtual machine 114, the initial image is referred to as the base image or parent image. This base image can also be sent from the snapshot agent 116 or the database 118 to the snapshot manager 122.

In exemplary embodiments, the snapshot agent 116 is configured to periodically take snapshots of the virtual machine 114. The snapshot agent 116 waits a period of time that can be determined via configuration or other intelligent algorithms which can calculate the best snapshot taking interval to optimize performance of the virtual machine 114. In exemplary embodiments, the snapshot agent 116 is configured to generate a delta image, which includes the changes that occurred in a virtual machine 114 in between captured snapshots. After creating the delta image the snapshot agent 116 transmits the delta image to the snapshot manager 122 and the snapshot agent 116 updates its base or parent image. The snapshot manager 122 receives the delta image from the snapshot agent 116 and merges, via the snapshot merger 124, the delta image with the base image to create a recovery image for the virtual machine 114. The snapshot manger 120 is configured to store the recovery images for the virtual machine 114 in a memory device 116.

In exemplary embodiments, each virtual machine 114 includes a snapshot agent 116 that is configured to receive virtual machine 114 operating data and to collect snapshots a configurable time interval. The snapshot agent 116 is also configured to send the snapshots to the mirror environment 120 for processing by the snapshot manager 122. In exemplary embodiments, the snapshot agent 116 may be configured to receive an image to start or restart a virtual machine 114. The snapshot agent 116 may include a policy engine that controls the snapshot collection and merging operations. In exemplary embodiments, the policy engine may collect system and application performance information and decide how frequently a snapshot should be taken. In addition, the policy engine may also decide the frequency of merging so as to optimize the performance of the entire system as a whole. In exemplary embodiments, the snapshot agent 116 may be configured to continuously monitor the health of the virtual machine 114 and may notify the snapshot manager 122 if the virtual machine 114 experiences abnormal behavior or crashes to enable the snapshot manager 122 to take corrective backup actions.

Figure 5:
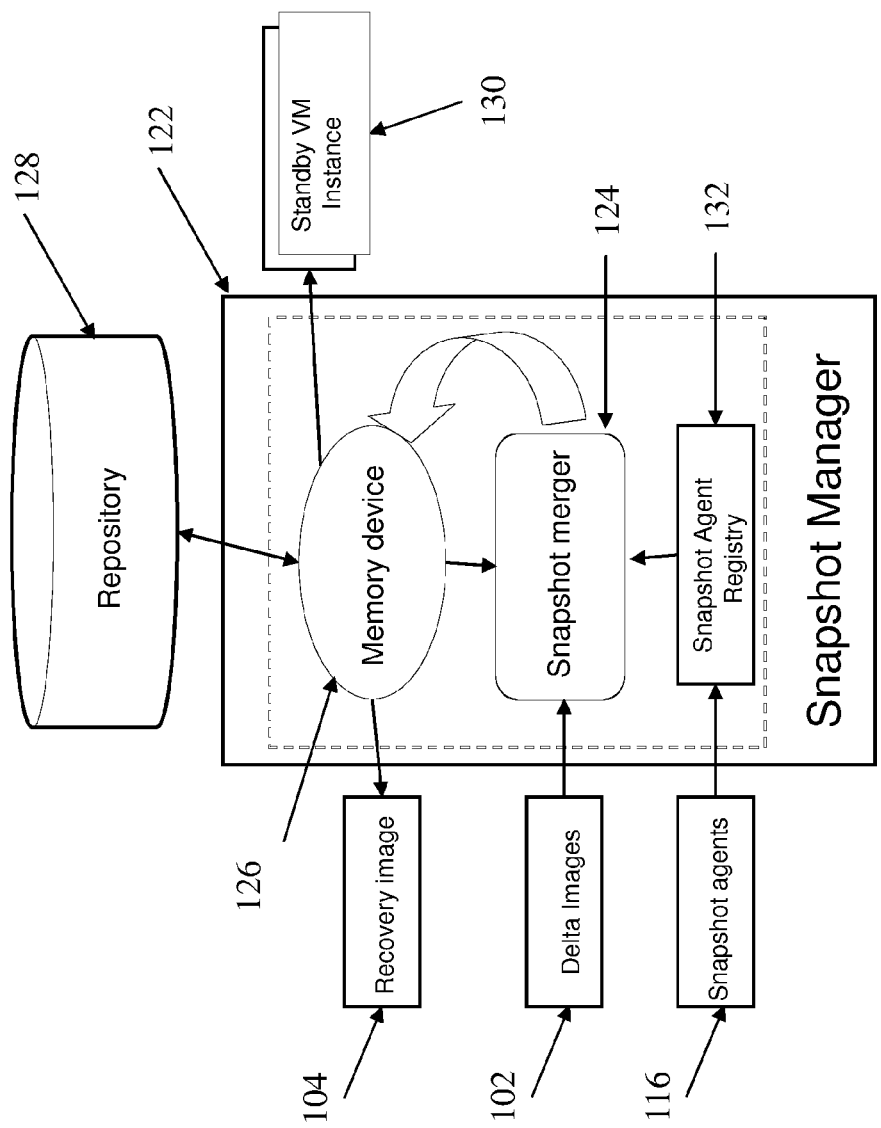
FIG. 5 illustrates a snapshot manager in accordance with exemplary embodiments.

Referring now to FIG. 5, a snapshot manager 122 in accordance with an exemplary embodiment is shown. In exemplary embodiments, snapshot manager 122 resides and runs on the mirror environment 120. In exemplary embodiments, the mirror environment 120 is a remote system which is configured to utilize resources that are not currently being utilized by the cloud. In addition, the location of the snap shot manager 120 can be migrated to another location within the cloud or outside of the cloud in response to workload fluctuation to minimize operation overhead. The snapshot manager 122 maintains a registry 132 for snapshot agents 116 and the registry 132 is responsible for updating the snapshot collection policy or configuration of the snapshot agents 116. The snapshot manager 122 communicates with each of the snapshot agents 116 and retrieves the most recent fully committed copy of any the virtual machines 114 running on in the production environment 110. The snapshot manager 122 receives delta images 102 collected by the snapshot agents 116 and performs merging, via the snapshot merger 124, with their respective parents as soon as the delta images 102 are received. The resulting recovery image 104 is then stored in the memory device 126 and is available for recovery purposes. In exemplary embodiments, a repository 128 may be used as a secondary storage component to provide backup storage for the recovery images for each of the virtual machines 114.

In exemplary embodiments, the snapshot manager 122 may maintain an array of standby virtual machines instances 130 in separate hosts with the recovery image as a direct replacement in case a virtual machines 114 experiences abnormal behavior or crashes, as observed by the snapshot agent 116. The collection of standby virtual machine instances 130 mirror the virtual machines 114 and are inactive until they are configured to replace their associated virtual machine 114.

Figure 6:
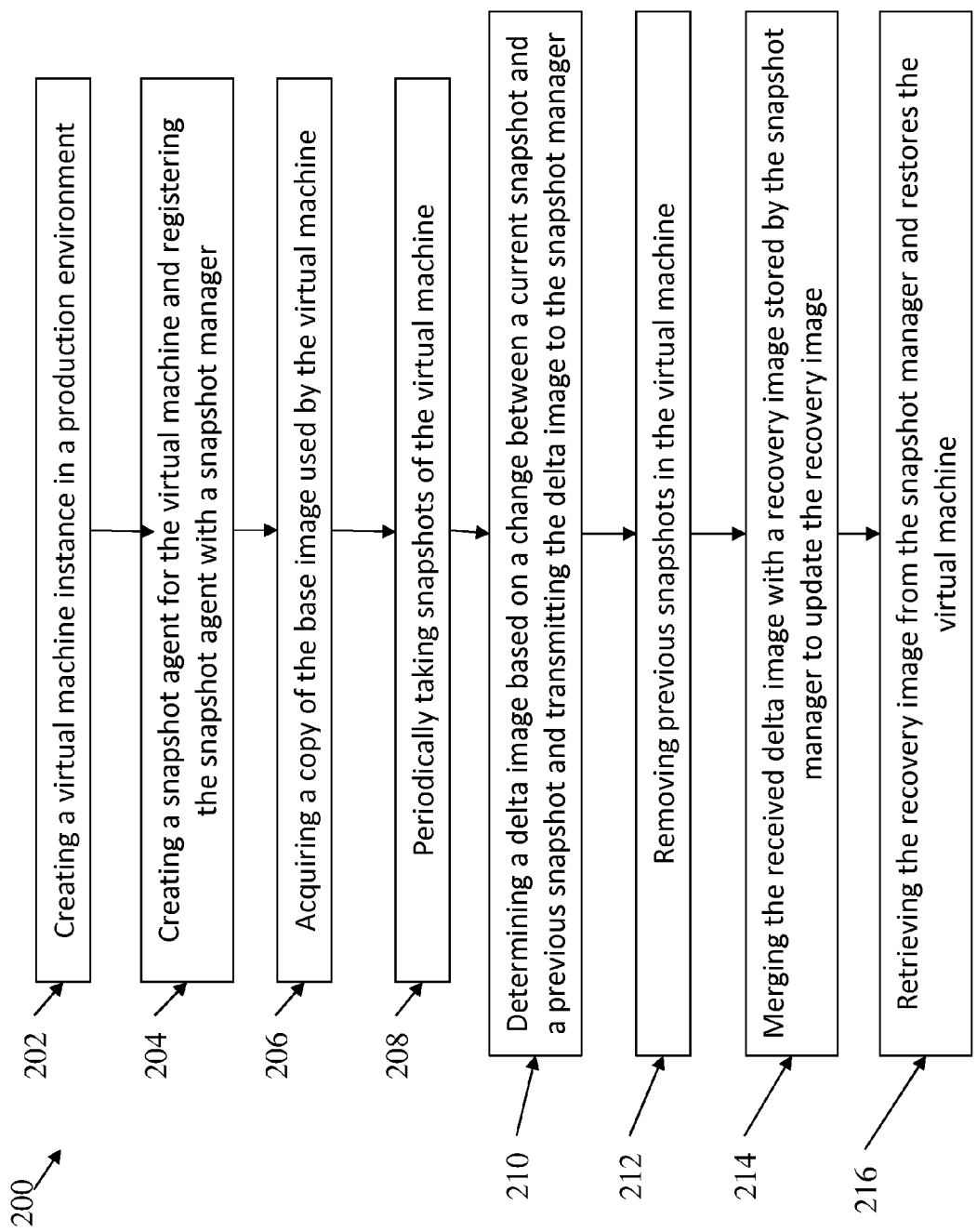
FIG. 6 is a flowchart illustrating a method for providing a high availability cloud server in accordance with an exemplary embodiment.

Referring now to FIG. 6, a flowchart illustrating a method 200 for providing a high availability cloud server is shown. As shown at block 202, the method 200 includes creating a virtual machine instance in a production environment per a customer request. Next, as shown at block 204, the method 200 includes creating a snapshot agent for the virtual machine and registering the snapshot agent with a snapshot manager. In exemplary embodiments, upon registration of the snapshot agent, the snapshot manager will instantiate the snapshot agent with a specified policy engine (or default if no preference is set) together with an operation policy. As shown at block 206, the method 200 includes the snapshot agent acquiring a copy of the base image used by the virtual machine.

As shown at block 208, the method 200 includes the snapshot agent taking snapshots of the virtual machine. Next, as shown at block 210, the method 200 determining a delta image based on a change between a current snapshot and a previous snapshot and transmitting the delta image to the snapshot manager. In exemplary embodiments, delta images from multiple virtual machines can be sent to the mirror environment individually or as a batch. Next, as shown at block 212, the method includes removing previous snapshots in the virtual machine. As shown at block 214, the method also includes merging the received delta images with a recovery image stored by the snapshot manager to update the recovery image. As shown at block 216, when a virtual machine experiences a failure and a recovery is needed, the snapshot manager retrieves the recovery image from the snapshot manager and restores the virtual machine. In exemplary embodiments, the snapshot manager may create standby instance of the virtual machines according to service level requirements of the virtual machines. For example, not all virtual machines need standby instances, some virtual machines will tolerate a small delay in powering on the virtual machines from the mirror virtual machines images.

Figure 7:
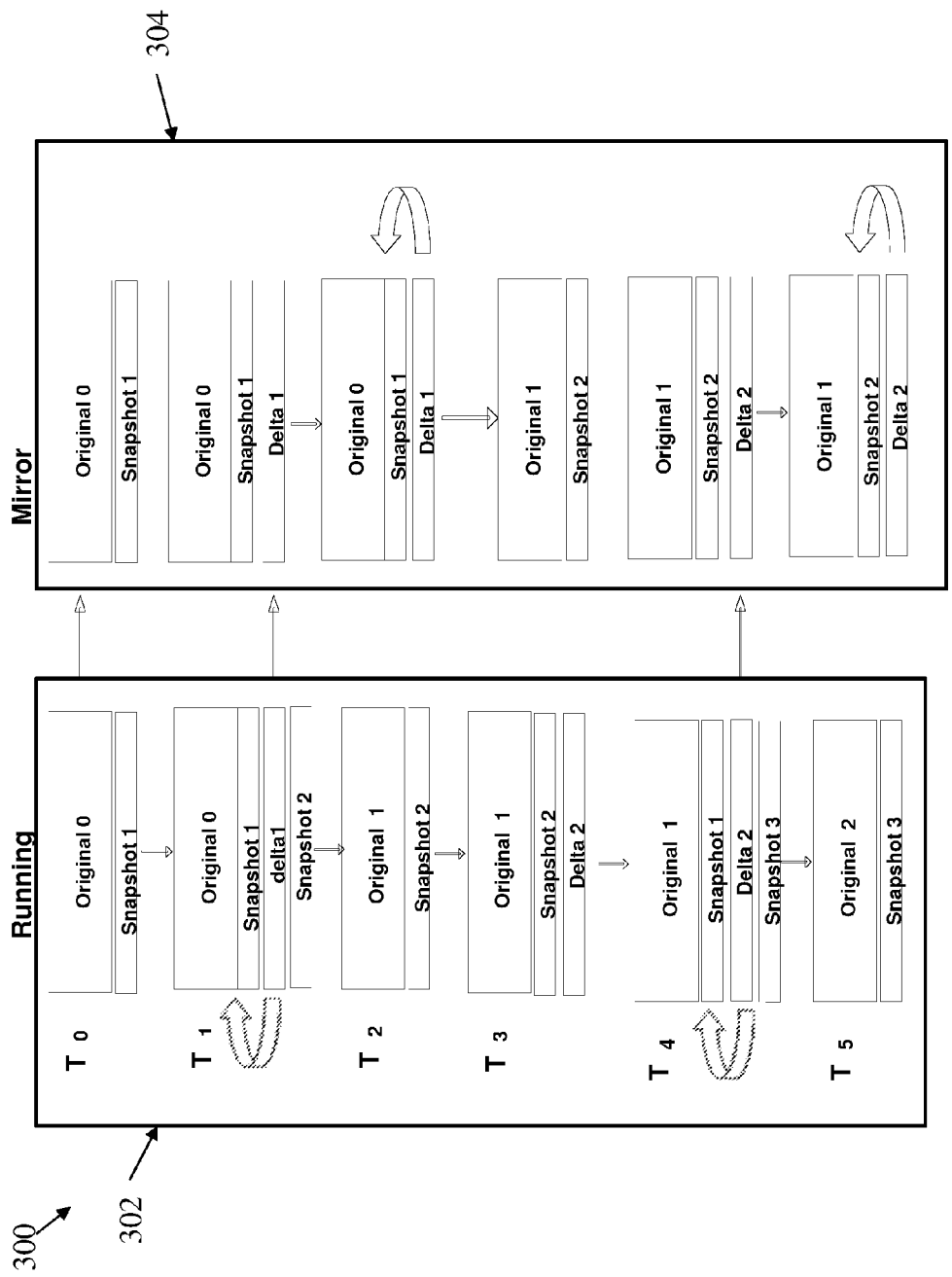
FIG. 7 illustrates a cloud computing environment in accordance with exemplary embodiments.

Referring now to FIG. 7, a timeline 300 illustrating the state of the snapshot images of an active virtual machine 302 and a mirror virtual machine 304 is shown. The size of both active and mirror virtual machine images grow with time with the mirror image always behind the active image with the running delta. Since the backup snapshots are copied to a remote host, merging can be done immediately upon new snapshot arrival while the merging of snapshots on the active virtual machine can be performed at longer interval. In exemplary embodiments, an algorithm or policy can be used to determine the most optimized time for snapshot collection and merging operation. In exemplary embodiments, with continuous snapshot collection the recovery image of the virtual machine is updated continuously. In exemplary embodiments, the high availability servers enable seamless and continuous virtual machine operation with negligible interruption.

In exemplary embodiments, the method for providing a high availability cloud server is configured to utilize unused resources in the cloud environment for the snapshot managers. In one embodiment, the snapshot manager may be configured to identify unused, or under utilized, resources in the cloud to automatically migrate to the identified resources. In another embodiment, the snapshot manager may rely on an external tool to identify unused, or under utilized, resources in the cloud to and may migrate to the identified resource.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a high availability system in a cloud computing environment, the method comprising:
   creating, by a processor, a virtual machine in response to a user request;
   creating a snapshot agent for the virtual machine and registering the snapshot agent with a snapshot manager, wherein the snapshot agent is configured to:
   periodically take snapshots of the virtual machine associated with the snapshot agent, wherein the snapshot includes all of the files that constitute the virtual machine including a state and a data of a virtual machine at a specific point in time;
   determine a delta image based on a change between a current snapshot and a previous snapshot;
   remove previous snapshots in the virtual machine;
   transmit the delta image to the snapshot manager; and
   monitor a health of the virtual machine and to notify the snapshot manager if the virtual machine experiences abnormal behavior;

receiving a recovery image for the virtual machine from the snapshot manager in response to the virtual machine experiencing abnormal behavior; and restoring the virtual machine with the recovery image, wherein the snapshot manager is configured to store the recovery image for the virtual machine and to merge the received delta image with the recovery image to update the recovery image;

wherein the snapshot agent comprises a policy engine configured to control snapshot collection, and wherein the policy engine is configured to collect system and application performance information for the virtual machine and to responsively determine how frequently snapshots are taken.

2. The method of claim 1, wherein the snapshot manager is configured to store the recovery image for the virtual machine and to merge the received delta images with the recovery image to update the recovery image.

3. The method of claim 1, wherein the snapshot manager is configured to create a standby instance of the virtual machine based on the recovery image.

4. The method of claim 3, wherein the standby instance of the virtual machine is used to replace to virtual machine in the event of a crash of the virtual machine.

* * * * *